United States Patent
Kurumasa et al.

(10) Patent No.: US 10,228,843 B2
(45) Date of Patent: Mar. 12, 2019

(54) IMAGE PROCESSING APPARATUS, METHOD OF CONTROLLING IMAGE PROCESSING APPARATUS, AND RECORDING MEDIUM

(71) Applicants: Yoichi Kurumasa, Toyokawa (JP);
Kenichi Sawada, Toyohashi (JP);
Masahiro Imamura, Toyokawa (JP);
Atsushi Tomita, Toyohashi (JP);
Tetsuya Tokumoto, Toyokawa (JP);
Ryosuke Nishimura, Toyokawa (JP);
Takatsugu Kuno, Toyokawa (JP)

(72) Inventors: Yoichi Kurumasa, Toyokawa (JP);
Kenichi Sawada, Toyohashi (JP);
Masahiro Imamura, Toyokawa (JP);
Atsushi Tomita, Toyohashi (JP);
Tetsuya Tokumoto, Toyokawa (JP);
Ryosuke Nishimura, Toyokawa (JP);
Takatsugu Kuno, Toyokawa (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 31 days.

(21) Appl. No.: 13/633,404

(22) Filed: Oct. 2, 2012

(65) Prior Publication Data
US 2013/0088449 A1 Apr. 11, 2013

(30) Foreign Application Priority Data

Oct. 6, 2011 (JP) .................. 2011-222186

(51) Int. Cl.
*G06F 3/041* (2006.01)
*G06F 3/0488* (2013.01)
*H04N 1/00* (2006.01)

(52) U.S. Cl.
CPC ..... *G06F 3/04883* (2013.01); *H04N 1/00411* (2013.01); *H04N 1/00413* (2013.01);
(Continued)

(58) Field of Classification Search
CPC ........... G06F 3/04883; H04N 1/00411; H04N 1/00469; H04N 1/00472; H04N 1/00413; H04N 2201/0094
(Continued)

(56) References Cited

U.S. PATENT DOCUMENTS 7,701,471 B1 4/2010 Young et al.
8,073,830 B2 * 12/2011 Fontes .............. G06F 17/30864
707/706

(Continued)

FOREIGN PATENT DOCUMENTS

CN 10151040 A 8/2009
CN 102640104 A 8/2012
(Continued)

OTHER PUBLICATIONS

Office Action (Notice of Grounds of Rejection) dated Oct. 22, 2013, by the Japanese Patent Office in corresponding Japanese Patent Application No. 2011-222186, and an English Translation of the Office Action. (6 pages).

(Continued)

*Primary Examiner* — Christopher E Leiby
(74) *Attorney, Agent, or Firm* — Buchanan Ingersoll & Rooney PC

(57) ABSTRACT

An image processing apparatus includes a display for displaying operational information for executing image processing, an operation unit for giving an input instruction in association with a display region appearing on the display, and a controller for controlling the display in accordance with the input instruction on the operation unit. The con- (Continued)

troller is configured to determine whether an input instruction of a flick operation is given through the operation unit in association with a prescribed display region appearing on the display. If it is determined that the input instruction of the flick operation is given, the controller is configured to enlarge a range of the prescribed display region in which the input instruction is allowed, and to display the enlarged display region on the display.

22 Claims, 12 Drawing Sheets

(52) U.S. Cl.
CPC ..... *H04N 1/00469* (2013.01); *H04N 1/00472* (2013.01); *H04N 2201/0094* (2013.01)

(58) Field of Classification Search
USPC ....................................................... 345/173
See application file for complete search history.

(56) References Cited

U.S. PATENT DOCUMENTS

| | | | |
|---|---|---|---|
| 2004/0145772 A1* | 7/2004 | Stringham | G06K 15/00 358/1.15 |
| 2009/0210810 A1 | 8/2009 | Ryu et al. | |
| 2009/0307188 A1* | 12/2009 | Oldham et al. | 707/3 |
| 2010/0007796 A1 | 1/2010 | Yamaji et al. | |
| 2010/0056221 A1* | 3/2010 | Park | 455/566 |
| 2011/0096096 A1 | 4/2011 | Matsuki | |
| 2011/0115822 A1* | 5/2011 | Bae | 345/661 |
| 2011/0131521 A1 | 6/2011 | Cho et al. | |
| 2011/0134075 A1* | 6/2011 | Takusa | 345/174 |
| 2011/0199629 A1* | 8/2011 | Sensu | H04N 1/00411 358/1.13 |
| 2011/0199639 A1 | 8/2011 | Tani et al. | |
| 2011/0216094 A1* | 9/2011 | Murakami | 345/660 |
| 2011/0296329 A1* | 12/2011 | Tanaka | 715/769 |
| 2011/0300910 A1* | 12/2011 | Choi | 455/566 |
| 2012/0019863 A1* | 1/2012 | Sensu et al. | 358/1.15 |

FOREIGN PATENT DOCUMENTS

| | | |
|---|---|---|
| JP | 2010-020616 A | 1/2010 |
| JP | 201190586 A | 5/2011 |
| JP | 2011-164835 A | 8/2011 |
| WO | 2011068373 A2 | 6/2011 |
| WO | 2011068374 A2 | 6/2011 |
| WO | 2011112533 A1 | 9/2011 |

OTHER PUBLICATIONS

[Android] Method of Displaying Conversion Candidates in ATOK Fully on Screen, Apr. 14, 2011, [Search on May 22, 2014], Internet (URL: http://romberg-iso8.blogspot.jp/2011/04/androidatok.html), with partial English translation. (4 pages).

ATOK on mini pro, Nov. 26, 2010, [Search on May 22, 2014], Internet (URL: http://willcomtogether.blog86.fc2.com/blog-entry-255.html), with partial English translation. (4 pages).

Office Action (Notice of Grounds of Rejection) dated May 27, 2014, by the Japan Patent Office in corresponding Japanese Patent Application No. 2011-222186, and an English translation of the Office Action. (7 pages).

First Office Action dated Sep. 1, 2014, by the State Intellectual Property Office of the People's Republic of China in Chinese Patent Application No. 201210366134.6, and an English translation of the Office Action. (14 pages).

European Search Report dated Mar. 3, 2015 in corresponding EP Application No. 12187413.5 (7 pages).

Japanese Final Rejection dated Mar. 10, 2015 in corresponding JP Application No. 2011-222186 (7 pages).

Just Systems, Candidate Window in ATOK for Android, Jun. 20, 2011 [Search on Feb. 20, 2015], Internet (URL: https://www.youtube.com/watch?v=JhfoH1u1T_0) (with partial English translation) (3 pages).

European Search Report dated Apr. 18, 2016 by the European Patent Office in corresponding European Patent Application No. 12 187 413.5 (9 pages).

Decision to Refuse dated Jul. 21, 2017, by the European Patent Office in corresponding European Patent Application No. 12 187 413.5 (36 pages).

European Search Report dated Jul. 21, 2017, by the European Patent Office in corresponding European Patent Application No. 12 187 413.5 (36 pages).

Second Office Action dated May 26, 2015, by the State Intellectual Property Office of The People's Republic of China in Chinese Patent Application No. 201210366134.6, and an English translation of the Office Action. (18 pages).

* cited by examiner

| ITEM | INPUT ACCEPTING REGION | NON-DISPLAY DISABLED REGION |
|---|---|---|
| SCAN/FAX ADDRESS LIST | ADDRESS INFORMATION | ALPHABETIC SORT KEY, NUMBER OF ADDRESSES |
| JOB LIST | JOB HISTORY | IN-PROGRESS KEY, HISTORY KEY, COMMUNICATION LIST KEY |
| BOX DOCUMENT LIST | SAVED DOCUMENT | SELECT ALL KEY, CLEAR ALL KEY |

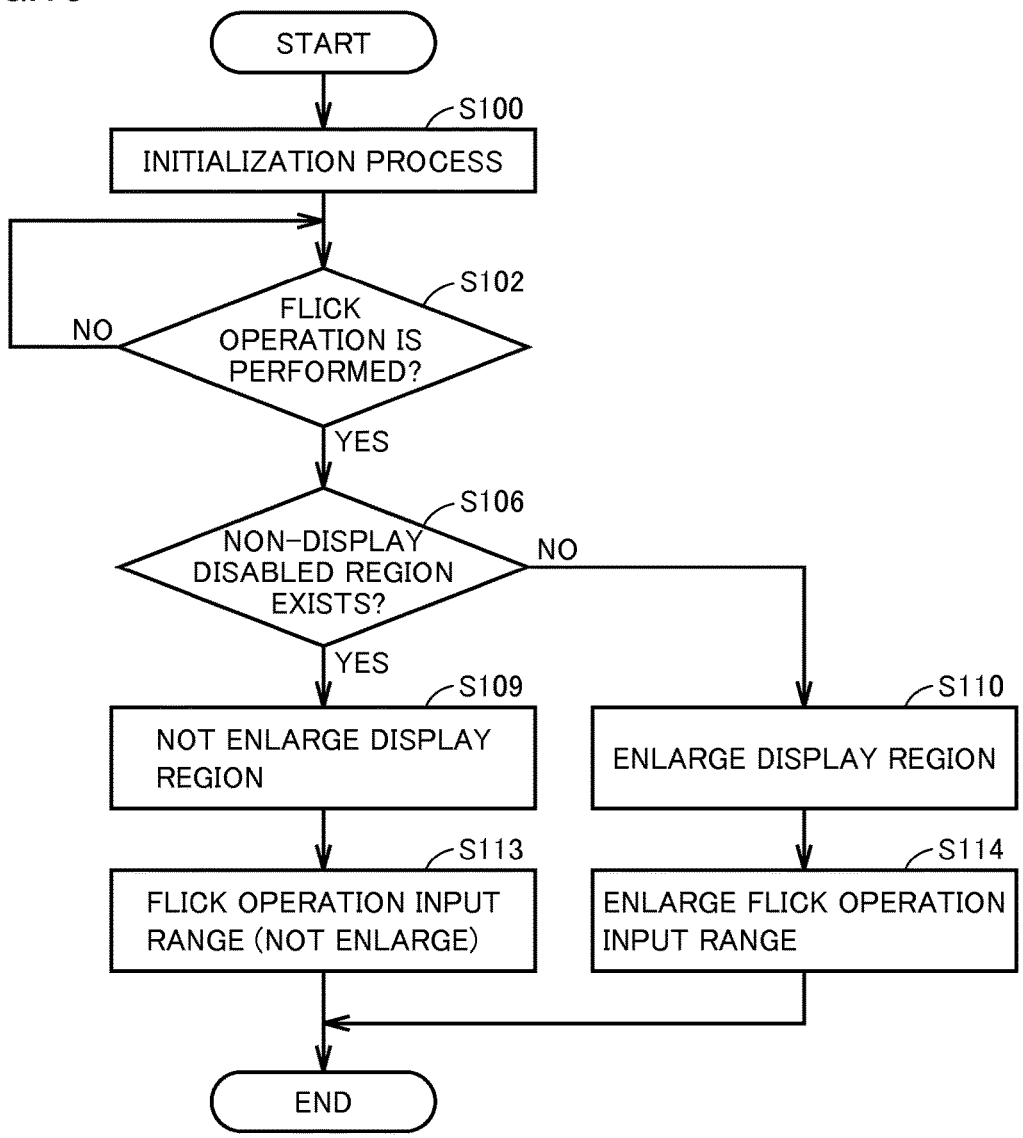

IMAGE PROCESSING APPARATUS, METHOD OF CONTROLLING IMAGE PROCESSING APPARATUS, AND RECORDING MEDIUM

This application is based on Japanese Patent Application No. 2011-222186 filed with the Japan Patent Office on Oct. 6, 2011, the entire content of which is hereby incorporated by reference.

BACKGROUND OF THE INVENTION

Field of the Invention

The present invention relates to an operation panel installed in an image processing apparatus and to a manner of display of operation in accordance with an operation for executing a function.

Description of the Related Art

In recent years, complex image processing apparatuses such as MFPs (Multi-Functional Peripherals) have been widely used. An MFP is an image processing apparatus, also called a multifunction printer, in which copy, network printing, scanner, fax, and BOX functions as a document server are all combined in one.

An image processing apparatus is generally installed with an operation panel for executing operations of image processing, and it is important to make it a user interface easily operated.

In this respect, for example, Japanese Laid-Open Patent Publication No. 2010-020616 proposes a technique in which a display region is divided in accordance with user information and situations, assuming that a plurality of users operate a display device. However, when a screen with a narrow operation region of the operation panel is divided, the operation region becomes even narrower and becomes difficult to operate.

On the other hand, abbreviated addresses registered therein are often displayed on the operation panel of an image processing apparatus, for example, in a scanner or fax. In a case where a large number of abbreviated addresses are registered, when a user searches the displayed abbreviated addresses for a desired address and does not find the desired abbreviated address in the screen, the user presses, for example, a page down key in the screen to change the pages to search. The number of abbreviated addresses to be displayed in a display region of an operation panel is limited under the constraint of the screen, and complicated operations may be required in some cases. In order to cope with this, for example, flick operation, which is a function equivalent to a page down key, may be employed to scroll the abbreviated addresses displayed in the display region.

However, the screen of the operation panel of an image processing apparatus is narrow, and a number of setting keys have to be arranged in one screen. Therefore, the range of a region for accepting input is narrow, which is a problem in improvement in operability.

SUMMARY OF THE INVENTION

An object of the present invention is to provide an image processing apparatus capable of providing a user interface with high operability even with a narrow screen, a method of controlling an image processing apparatus, and a recording medium.

According to an aspect of the present invention, an image processing apparatus includes a display for displaying operational information for executing image processing, an operation unit for giving an input instruction in association with a display region appearing on the display, and a controller for controlling the display in accordance with the input instruction on the operation unit. The controller is configured to determine whether the input instruction of a flick operation is given through the operation unit in association with a prescribed display region appearing on the display. If it is determined that the input instruction of the flick operation is given, the controller is configured to enlarge a range of the prescribed display region in which the input instruction is allowed, and to display the enlarged display region on the display.

Preferably, the controller determines whether the input instruction of the flick operation is given, based on coordinates at which the input instruction of a touch operation is accepted through the operation unit and coordinates at which the input instruction of the touch operation is terminated through movement.

Preferably, the input instruction of the flick operation includes an input direction of the flick operation. If it is determined that the input instruction of the flick operation is given, the controller enlarges the range of the prescribed display region in which the input instruction is allowed, in accordance with the input direction of the flick operation, and displays the enlarged display region on the display.

Preferably, if it is determined that the input instruction of the flick operation is given, the controller further determines whether prescribed information is hidden when the range of the prescribed display region appearing on the display is enlarged. The controller enlarges the range of the prescribed display region in which the input instruction is allowed, based on a result of the determination, and displays the enlarged display region on the display.

In particular, the prescribed information includes a prescribed icon.

In particular, the prescribed information is predefined for the prescribed display region.

Preferably, a cursor for scrolling a display content displayed in the prescribed display region in accordance with the input instruction through the operation unit is displayed on the display. The cursor has a length corresponding to the prescribed display region. The controller enlarges the length of the cursor along with enlargement of the range of the prescribed display region appearing on the display, and displays the enlarged cursor on the display.

Preferably, a list of a plurality of pieces of information is displayed in the prescribed display region.

According to another aspect of the present invention, a method of controlling an image processing apparatus is provided. The image processing apparatus includes a display for displaying operational information for executing image processing and an operation unit for giving an input instruction in association with a display region appearing on the display. The method includes the steps of: determining whether the input instruction of a flick operation is given through the operation unit in association with a prescribed display region appearing on the display, if it is determined that the input instruction of the flick operation is given, enlarging a range of the prescribed display region in which the input instruction is allowed, and displaying the enlarged display region on the display.

Preferably, the step of determining includes the step of determining whether the input instruction of the flick operation is given, based on coordinates at which the input instruction of a touch operation is accepted through the operation unit and coordinates at which the input instruction of the touch operation is terminated through movement.

Preferably, the input instruction of the flick operation includes an input direction of the flick operation. If it is determined that the input instruction of the flick operation is given, the step of enlarging includes the step of enlarging the range of the prescribed display region in which the input instruction is allowed, in accordance with the input direction of the flick operation, and the step of displaying includes the step of displaying the enlarged display region on the display.

Preferably, the step of enlarging further includes: if it is determined that the input instruction of the flick operation is given, the step of determining whether prescribed information is hidden when the range of the prescribed display region appearing on the display is enlarged; and the step of enlarging a range of the prescribed display region in which the input instruction is allowed, based on a result of the determination, and the step of displaying includes the step of displaying the enlarged display region on the display.

In particular, the prescribed information includes a prescribed icon.

In particular, the prescribed information is predefined for the prescribed display region.

Preferably, a cursor for scrolling a display content displayed in the prescribed display region in accordance with the input instruction through the operation unit is displayed on the display. The cursor has a length corresponding to the prescribed display region. The step of enlarging includes the step of enlarging the length of the cursor along with enlargement of the range of the prescribed display region appearing on the display and the step of displaying includes the step of displaying the enlarged cursor on the display.

Preferably, a list of a plurality of pieces of information is displayed in the prescribed display region.

According to a further aspect of the present invention, a recording medium is encoded with a control program executed by a computer of an image processing apparatus including a display for displaying operational information for executing image processing and an operation unit for giving an input instruction in association with a display region appearing on the display. The control program allows the computer to execute processing including: the step of determining whether the input instruction of a flick operation is given through the operation unit in association with a prescribed display region appearing on the display, if it is determined that the input instruction of the flick operation is given, the step of enlarging a range of the prescribed display region in which the input instruction is allowed, and the step of displaying the enlarged display region on the display.

Preferably, the step of determining includes the step of determining whether the input instruction of the flick operation is given, based on coordinates at which the input instruction of a touch operation is accepted through the operation unit and coordinates at which the input instruction of the touch operation is terminated through movement.

Preferably, the input instruction of the flick operation includes an input direction of the flick operation. If it is determined that the input instruction of the flick operation is given, the step of enlarging includes the step of enlarging the range of the prescribed display region in which the input instruction is allowed, in accordance with the input direction of the flick operation, and the step of displaying includes the step of displaying the enlarged display region on the display.

Preferably, the step of enlarging further includes: if it is determined that the input instruction of the flick operation is given, the step of determining whether prescribed information is hidden when the range of the prescribed display region appearing on the display is enlarged; and the step of enlarging the range of the prescribed display region in which the input instruction is allowed, based on a result of the determination, and the step of displaying includes the step of displaying the enlarged display region on the display.

In particular, the prescribed information includes a prescribed icon.

In particular, the prescribed information is predefined for the prescribed display region.

Preferably, a cursor for scrolling a display content displayed in the prescribed display region in accordance with the input instruction through the operation unit is displayed on the display. The cursor has a length corresponding to the prescribed display region. The step of enlarging includes the step of enlarging the length of the cursor along with enlargement of the range of the prescribed display region appearing on the display and the step of displaying includes the step of displaying the enlarged cursor on the display.

Preferably, a list of a plurality of pieces of information is displayed in the prescribed display region.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a flowchart illustrating an overview of a process of CPU 101 in accordance with flick operation on the operation panel of image processing apparatus 1-x according to a third modification of the embodiment of the present invention.

DESCRIPTION OF THE PREFERRED EMBODIMENTS

Figure 1:
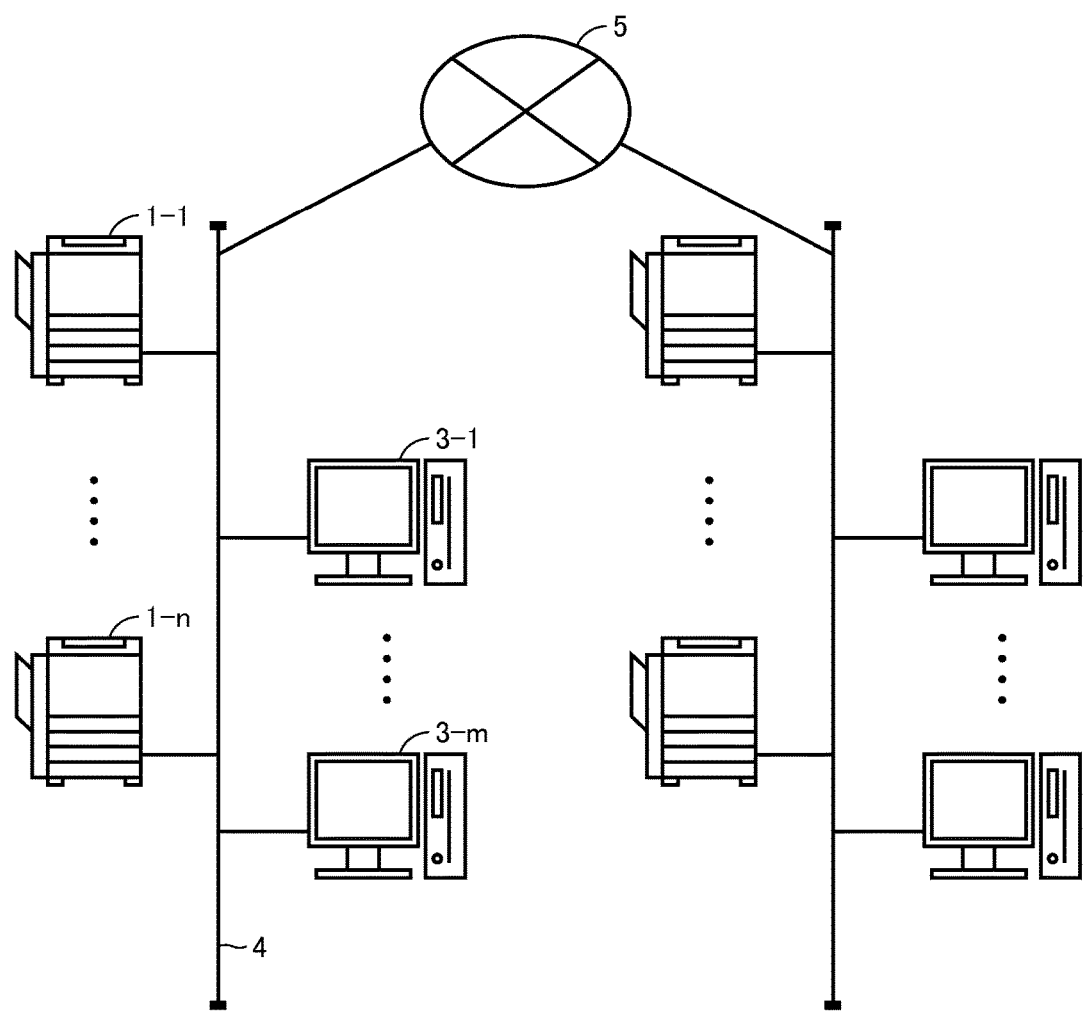
FIG. 1 is a schematic diagram illustrating an image forming system according to an embodiment of the present invention.

Embodiments of the present invention will be described in detail with reference to the figures. It is noted that in the figures the same or corresponding parts are denoted with the same reference numerals and a description thereof will not be repeated.

FIG. 1 is a schematic diagram illustrating an image forming system according to an embodiment of the present invention.

In the following, the embodiment of the present invention will be described. The present image forming system is configured to include an image processing apparatus 1-x (x: 1 to n) and an information processing apparatus 3-y (y: 1 to m).

Image processing apparatus 1-x and information processing apparatus 3-y are both connected via a network 4.

Here, network 4 may be a network using a dedicated line such as a LAN (Local Area Network), a network using a general line, or a network by radio communication. Network 4 is connected to another network via an external network 5.

Image processing apparatus 1-x is an apparatus for forming a scanned original image and a copy image of an image generated from print data transmitted from information processing apparatus 3-y, on a sheet of paper. Here, print data refers to an imaging instruction in a page description language, in which an imaging instruction issued by an operating system or an application program of information processing apparatus 3-y is converted by a printer driver into a page description language that can be processed by image forming apparatus 1-x, or document data written in a file format such as PDF (Portable Document Format), TIFF (Tagged Image File Format), JPEG (Joint Photographic Experts Group), or XPS (XML Paper Specification).

The scanned original image may be transmitted to information processing apparatus 3-y and to another image processing apparatus via network 4. Furthermore, the original image may be transmitted to another image processing apparatus or information processing apparatus connected to another network via external network 5.

Information processing apparatus 3-y is a general computer including a CPU, a RAM, a fixed storage device (hard disk device, for example), a monitor, a keyboard, a mouse, and the like. Information processing apparatus 3-y generates print data in accordance with a user's instruction and transmits the generated print data to image processing apparatus 1-x.

Figure 2:
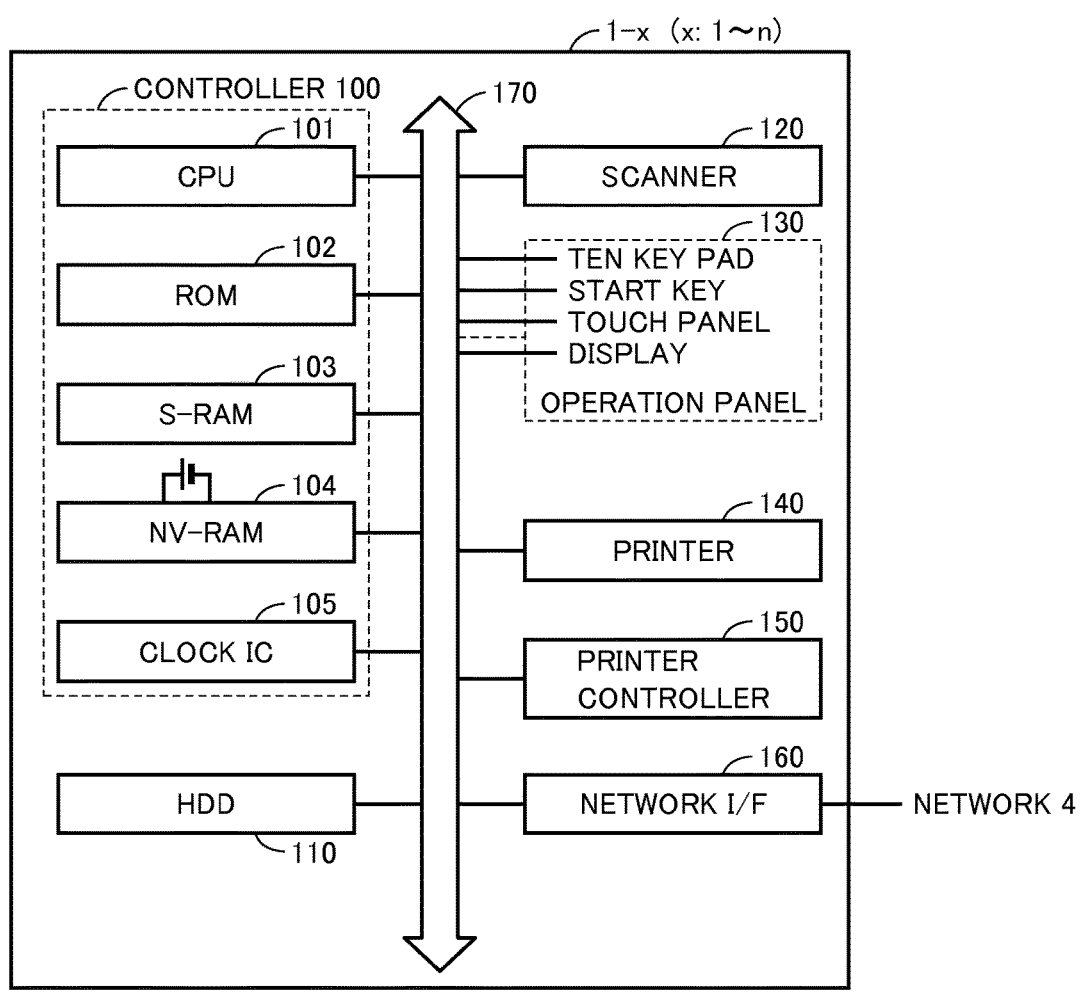
FIG. 2 is a diagram illustrating an internal configuration of an image processing apparatus 1-x according to the embodiment of the present invention.

FIG. 2 is a diagram illustrating an internal configuration of image processing apparatus 1-x according to the embodiment of the present invention.

Referring to FIG. 2, a ROM 102 storing a control program, an S-RAM (Static Random Access Memory) 103 as a working memory, a battery-backed NV-RAM (nonvolatile memory) 104 storing settings related to image forming, and a clock IC 105 capable of keeping time are connected to a CPU 101 of image processing apparatus 1-x according to the embodiment of the present invention through a bus to configure a controller 100.

Connected to controller 100 through a bus are a scanner 120 for scanning an original image, an operation panel 130 having keys for various inputs and a display, a network I/F 160 for transmitting/receiving various information to/from external devices including information processing apparatus 3-y connected via network 4, a printer controller 150 for generating a copy image from print data received by network I/F 160, and a printer 140 for forming a copy image on a sheet of paper.

A fixed storage device 110 is also connected to controller 100 through a bus. Fixed storage device 110 is, for example, a hard disk device.

Figure 3:
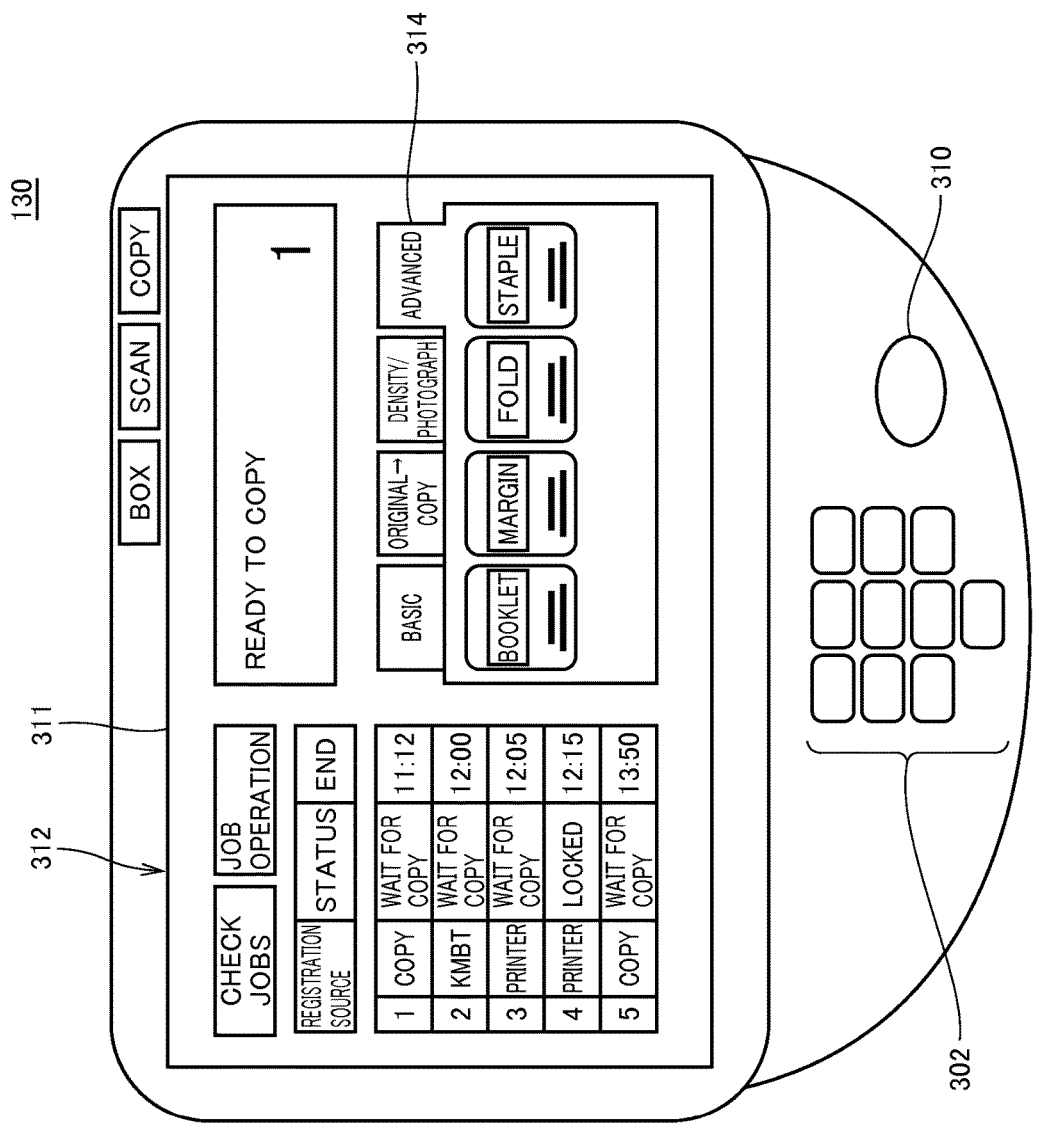
FIG. 3 is a diagram illustrating a configuration of an operation panel 130 according to the embodiment of the present invention.

FIG. 3 is a diagram illustrating a configuration of operation panel 130 according to the embodiment of the present invention.

Referring to FIG. 3, operation panel 130 according to the embodiment of the present invention includes a display 312, a ten key pad 302, a start button 310, and a touch panel 311. It is noted that other keys are not shown.

Touch panel 311 is provided on display 312 to enable prescribed touch operation on display 312. In this example, touch panel 311 is arranged in approximately the same region as the region of display 312. However, the extent of the region may be changed as necessary. Ten key pad 302 is a button for inputting, for example, the number of copies. Start button key 310 is a button for giving an instruction to execute, for example, a process of copy/scan.

Display 312 provides display of a variety of modes as operational information for executing image processing, and any other display. Then, touch panel 311 can be used to make settings in accordance with the display content. For example, tab buttons 314 are normally arranged on display 312 for basic/advanced settings which are made when a copy operation or a scan operation is executed. When each tab button is pressed, a hierarchical screen for making detailed settings appears. In the shown example, an advanced tab button is pressed. The range in which input is accepted from touch panel 311 is preset in accordance with the contents displayed on display 312, that is, the display region. A manner of operation accepted as input is also predetermined corresponding to the display region. In this example, the manner of operation includes not only touch operation but also flick operation described later.

At the top of display 312, function select buttons including a "BOX" button, a "scan" button, and a "copy" button are provided. The functions can be switched by pressing those buttons.

Specifically, pressing the "BOX" button provides display related to the box function and enables various operations of the BOX function. Similarly, pressing the "scan" button provides display related to the scan function on display 312 and enables various operations of the scan function. Similarly, pressing the "copy" button provides display related to the copy function on display 312 and enables various operations of the copy function. The display shown in the figure is the display related to operations of the copy function.

[Flick Operation Process in Operation Panel of Image Processing Apparatus 1-x]

Figure 4:
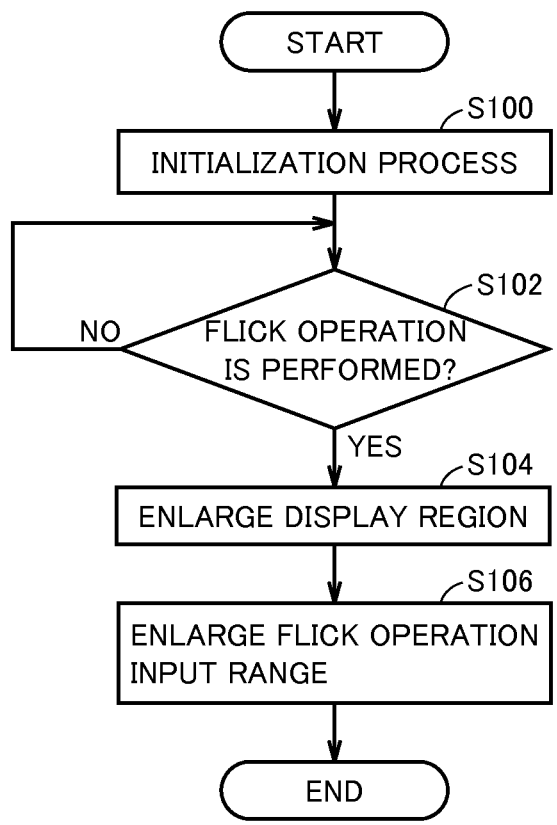
FIG. 4 is a flowchart illustrating an overview of a process of CPU 101 in accordance with flick operation on the operation panel of image processing apparatus 1-x according to the embodiment of the present invention.

FIG. 4 is a flowchart illustrating an overview of a process of CPU 101 in accordance with flick operation on the operation panel of image processing apparatus 1-x according to the embodiment of the present invention.

Referring to FIG. 4, CPU 101 starts the process upon power-on. First, an initialization process including clearing the memory, setting the standard mode, and the like is performed (step S100).

Upon completion of the initialization process in step S100, it is determined whether the user performs flick operation, based on input to touch panel 311 on the display of operation panel 130 of image processing apparatus 1-*x* (step S102).

In step S102, if it is determined that flick operation is performed (YES in step S102), the display region is changed (enlarged) (step S104).

In addition, the range of input accepted as flick operation is enlarged in accordance with the changed display region (step S106). Then, the process ends (END). The order of step S104 and step S106 may be reversed. The enlargement of the accepted input range is not limited to flick operation and is applicable to any other operation.

[Process in Touch Panel]

The operation of touch panel 311 provided on the operation panel of image processing apparatus 1-*x* will now be described.

Figure 5:
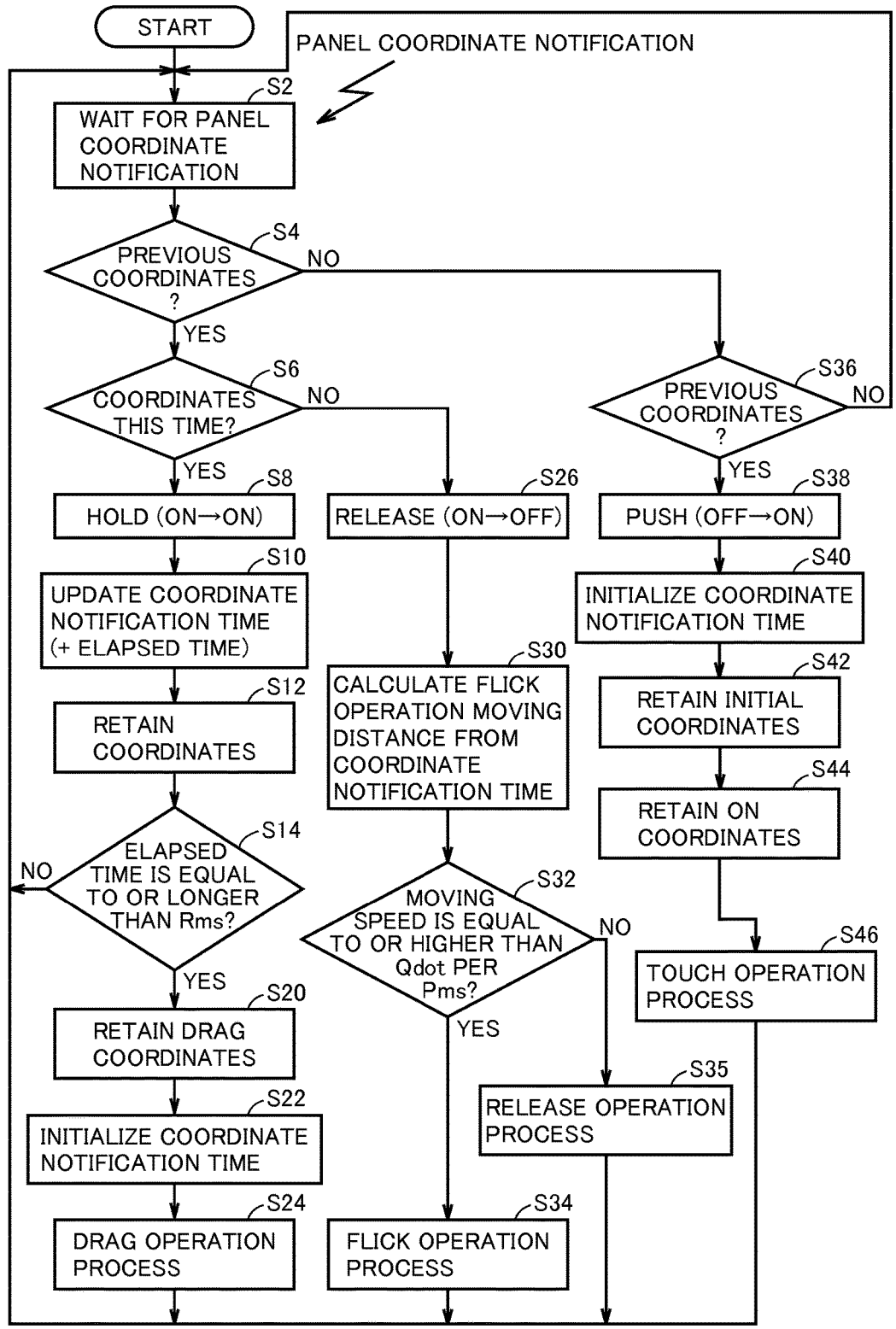
FIG. 5 is a flowchart illustrating an operation of touch panel 311 according to the embodiment of the present invention.

FIG. 5 is a flowchart illustrating an operation of touch panel 311 according to the embodiment of the present invention. This process is performed by CPU 101.

Referring to FIG. 5, first, a process of waiting for a panel coordinate notification (step S2) is executed. The panel coordinates are coordinate positions (x, y) where the user touches on touch panel 311 by the operating finger. CPU 101 is notified of those coordinate positions. The notification of coordinate positions is given at prescribed time intervals. Therefore, if the notification at prescribed time intervals is not continued, it can be determined that panel coordinates do not exist this time.

Then, it is determined whether the panel coordinates during the previous ON exist (step S4). The panel coordinates during the previous ON are the previous panel coordinates that are retained, and it is determined whether such panel coordinates are retained. This point will be described later.

If it is determined that the panel coordinates during the previous ON do not exist (NO in step S4), it is determined whether panel coordinates exist this time (step S36). That is, it is determined whether a notification of panel coordinates is given.

If the notification of panel coordinates is not given (NO in step S36), the process returns to step S2, and a similar process is repeated.

On the other hand, in step S36, if it is determined that panel coordinates exist this time (YES in step S36), the process proceeds to step S38. In this case, there exist no previous panel coordinates retained, and this is the initial operation.

In step S38, it is determined that a non-operating state shifts to an operation-detected state, that is, PUSH (OFF→ON).

Then, a coordinate notification time is initialized (reset) (step S40). Then, initial coordinates are retained (step S42). Specifically, the coordinates in the notification are retained. The coordinates initially operated are retained as the initial coordinates.

Then, the coordinates are retained as the panel coordinates during ON (step S44).

The coordinate notification time, the retained initial coordinates, and the panel coordinates during ON are used to determine operation other than touch operation, for example, drag operation or flick operation.

Then, it is determined as a touch operation process (step S46).

The process then returns to step S2.

For example, when a touch operation process is made, it is determined that the designated displayed content is selected, and the designated display content/display region is highlighted.

In step S4, if it is determined that there exist panel coordinates during the previous ON (YES in step S4), it is determined whether panel coordinates exist this time (step S6). That is, it is determined whether a notification of panel coordinates is given.

In step S6, if it is determined that panel coordinates exist this time (YES in step S6), it is determined that the operation-detected state is continued, that is, HOLD (ON→ON) (step S8).

Then, the coordinate notification time is updated (+ the elapsed time) (step S10). For example, the coordinate notification time is updated by keeping the time period passed since the coordinate notification time is initialized (reset).

Then, the coordinates in the notification of panel coordinates are retained (step S12). That is, the coordinates are retained as the panel coordinates during ON. The retained coordinates are used again to determine whether the panel coordinates during the previous ON exist in step S4.

Then, it is determined whether the elapsed time is equal to or longer than Rms (step S14).

In step S14, if it is determined that the elapsed time is shorter than Rms (NO in step S14), the process returns to step S2 again. That is, this process is repeated until the time Rms has elapsed. A flick operation process or a release operation process described later corresponds to a case where touch on touch panel 311 by the finger is stopped before the time Rms has elapsed.

In step S14, if it is determined that the elapsed time is equal to or longer than Rms (YES in step S14), the drag coordinates are retained (step S20). That is, the panel coordinates in the notification given this time are retained as the drag coordinates, that is, reference coordinates for performing a drag operation process. The designated region corresponding to the drag coordinates is a target to be dragged, by way of example.

Then, in step S20, after the drag coordinates are retained, the coordinate notification time is initialized (reset) (step S22). The coordinate notification time is reset because it is not used in the drag operation. The initial coordinates and the panel coordinates during ON are also initialized.

Then, it is determined as a prescribed drag operation process in accordance with the retained drag coordinates (step S24).

The process then returns to step S2.

On the other hand, in step S6, if it is determined that panel coordinates do not exist this time (NO in step S6), that is, if it is determined that a notification of panel coordinates is not given, it is determined that the operating state shifts to a non-operating state, that is, RELEASE (ON→OFF) (step S26).

Then, a moving distance of the flick operation is calculated based on the coordinate notification time (step S30). In this example, it is assumed that the moving distance is predefined in relation to the coordinate notification time. Specifically, the longer the coordinate notification time is, the longer the moving distance is, whereas the shorter the coordinate notification time is, the shorter the moving distance is.

Then, it is determined that the coordinate moving speed is equal to or higher than Qdot per Pms (step S32). Specifically, in movement in coordinates, the retained panel coordinates before RELEASE (ON→OFF) are the final coordinates. Thus, the distance (dot) from the initial coordinates retained when the user initially touches to the final coordinates. Then, the coordinate moving speed can be calculated by dividing the distance (dot) by the coordinate notification time. Then, it is determined whether the calculated moving speed is equal to or higher than Qdot/Pms as a threshold value.

In step S32, if it is determined that the moving speed is equal to or higher than Qdot/Pms (YES in step S32), it is determined as a flick operation process (step S34). The process then returns to step S2. That is, as the flick operation process, for example, a screen scroll process is executed in accordance with the calculated moving distance of the flick operation.

In step S32, if it is determined that the moving speed is lower than Qdot/Pms (NO in step S32), it is determined as a release operation process (step S35). The process then returns to step S2. That is, in the case where the moving speed is lower than Qdot/Pms, the process is determined as a release operation process in which touch is released, that is, a not-selected state.

When the flick operation process and the release operation process are executed, the initial coordinates and the previous coordinates are initialized. This brings about the initial state again thereby to allow a select operation such as touch operation to be executed.

Specifically, for example, when the user touches a position in the touch panel, a notification of the panel coordinates where the user touches is given, and it is determined as PUSH (OFF→ON). That is, it is determined as a touch operation process, and, for example, the position is highlighted.

If the position is kept touched with this state being kept, it is determined as HOLD (ON→ON). Then, if this state continues for a prescribed time Rms or longer, it is determined as the drag operation process, and for example, a file corresponding to the drag coordinates is selected and ready to be moved. Then, the file is moved together with the position of the finger that touches the file. Then, a drop process is executed to release the file selected state at the position where the touch is released. The drag operation then ends.

Furthermore, when the user touches a position in the operation panel and thereafter moves the finger to release the touch, it is determined as RELEASE (ON→OFF). Then, if the coordinate moving speed satisfies a prescribed condition, for example, if the user quickly moves the finger downward, it is determined as a flick operation process, and, for example, scroll display is executed.

On the other hand, if the coordinate moving speed does not satisfy a prescribed condition, for example, if the user hardly moves the finger, it is determined as a release operation process of simply releasing the touch.

Figure 6:
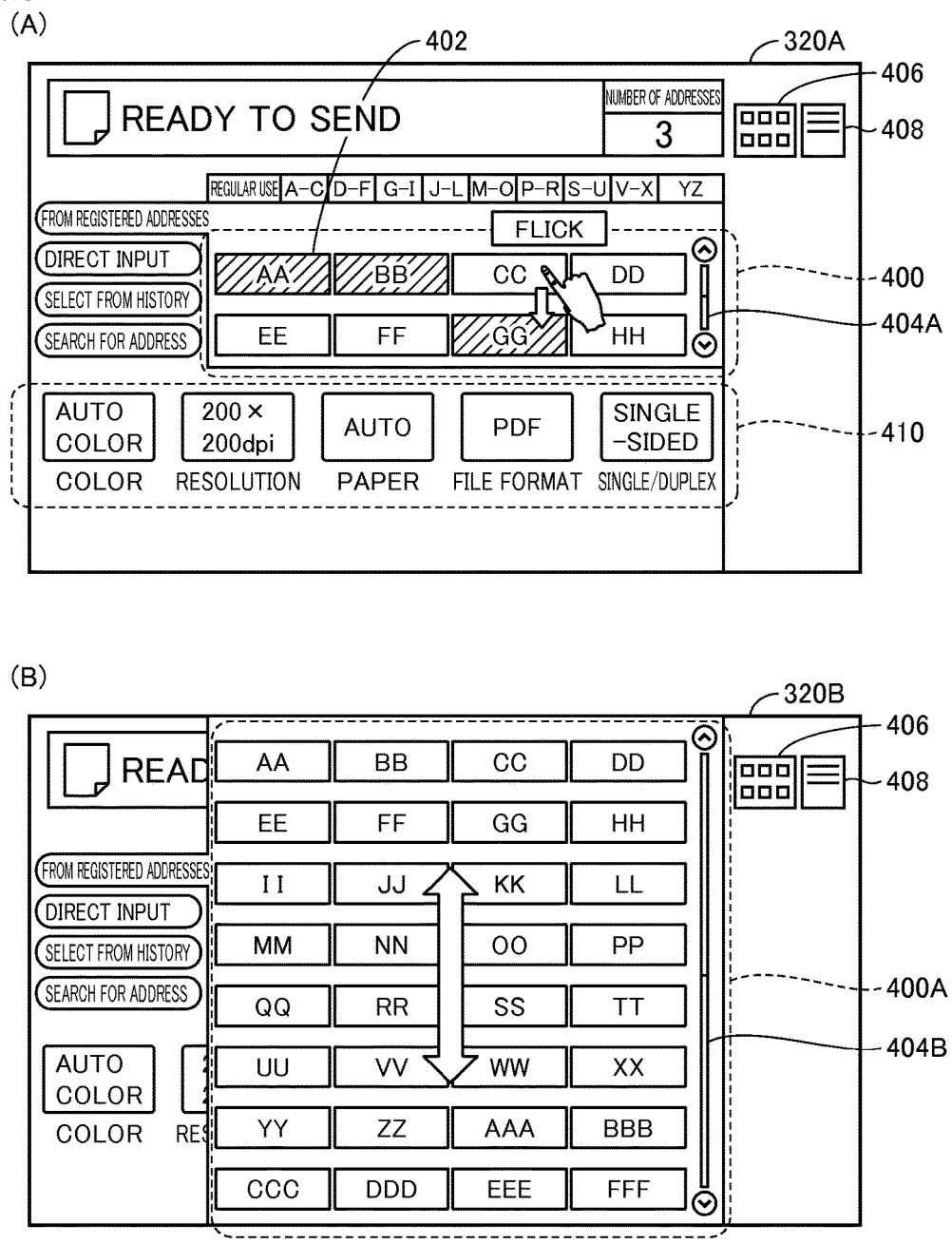
FIG. 6 is a diagram illustrating an example of a flick operation process in the operation panel according to the embodiment of the present invention.

FIG. 6 is a diagram illustrating an example of a flick operation process on the operation panel according to the embodiment of the present invention.

Referring to FIG. 6(A), here, a list of registered transmission addresses is displayed on an operation screen 320A of the operation panel.

A plurality of registered addresses "AA," "BB," ... "HH" are displayed in a registered address list region 400. A cursor bar 404A is provided. An up button or down button of cursor bar 404A is pressed to scroll the registered addresses displayed in list region 400.

The operation is not limited to the manner described above. In this example, list region 400 is preset as a region for accepting the flick operation. Then, scrolling is executed by accepting the flick operation in this region.

Here, a setting screen region 410 is also provided in which a scan/fax transmission mode (color, resolution, paper, file format, single/duplex) is set.

Buttons 406 and 408 are provided to change a manner of display in list region 400. Button 406 is a button to divide the list region into prescribed segments and provide display on a cell-by-cell basis. Button 408 is a button to provide display in the form of a list in the vertical direction. The display format can be changed by selectively pressing those buttons.

Referring to FIG. 6(B), here, an operation screen 320B of the operation panel in a case where the flick operation is accepted will be explained.

As shown in the figure, a registered address list region 400A is enlarged upward and downward and displayed in response to acceptance of the flick operation. Here, the registered addresses "AA," "BB," ... "FFF" are displayed.

This process allows the user to easily grasp the contents displayed in list region 400A because of the enlargement of the registered address list region 400A. In addition, the range set acceptable in which input of the flick operation can be executed is enlarged corresponding to list region 400A. Cursor bar 404B is also displayed in an expanded (enlarged) state when the input range is enlarged.

In FIG. 6(A), the range of list region 400 for accepting the flick operation or the like is narrow, so that an input instruction such as the flick operation has to be executed in the narrow range, thereby forcing tight operation on the user. By contrast, in FIG. 6(B), the input of the flick operation of the like in the enlarged display region becomes possible, thereby improving operability. That is, even when the screen of the operation panel is narrow, a user interface with high operability in the flick operation or the like is implemented. It is noted that not only the flick operation but also any other operations such as a touch operation is possible in list region 400, and the operability for any other operation inputs is also enhanced by enlarging the display region for accepting input.

(First Modification)

Figure 7:
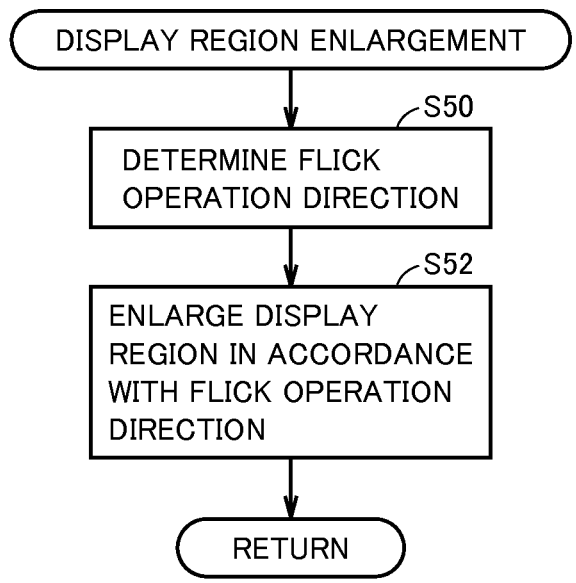
FIG. 7 is a flowchart illustrating enlargement of a display region according to a first modification of the embodiment of the present invention.

FIG. 7 is a flowchart illustrating enlargement of the display region according to a first modification of the embodiment of the present invention. This process is performed by CPU 101.

Referring to FIG. 7, first, the direction of the flick operation is determined (step S50). Specifically, the direction of the flick operation is determined based on the coordinate positions (the initial coordinates and the final coordinates). It is determined which direction is taken in the movement, based on the initial coordinates and the final coordinates. For example, the directions can be classified into up, left, right, down directions.

Next, the display region is enlarged in accordance with the flick operation direction (step S52). For example, when the direction of the flick operation is the up or down direction, the registered address list region 400A can be enlarged upward and downward as shown in FIG. 6(B).

On the other hand, when the direction of the flick operation is the right or left direction, the display region may be enlarged leftward and rightward.

Figure 8:
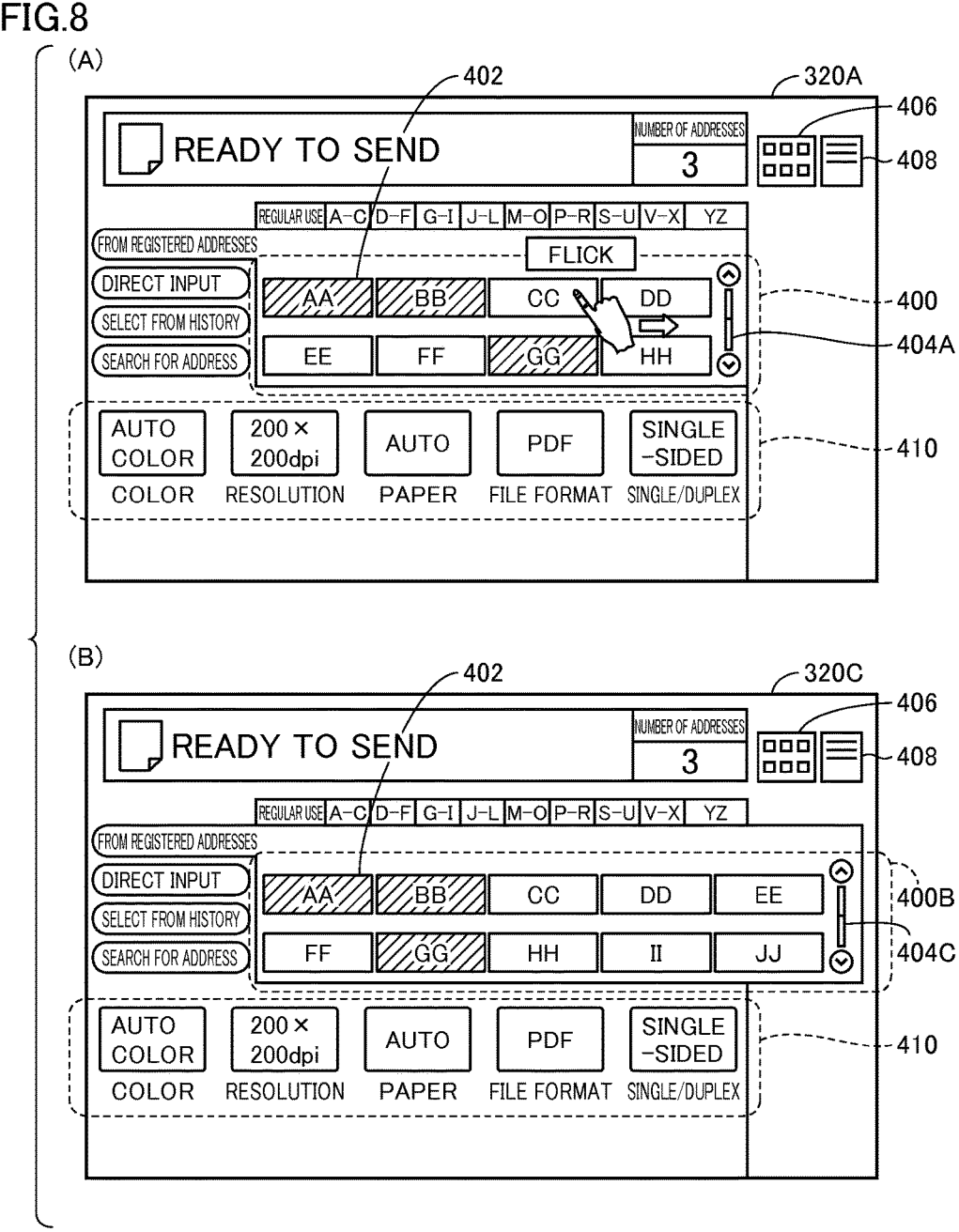
FIG. 8 is a diagram illustrating another example of a flick operation process in the operation panel according to the embodiment of the present invention.

FIG. 8 is a diagram illustrating another example of the flick operation process in the operation panel according to the embodiment of the present invention.

Referring to FIG. 8(A), here, a list of registered transmission addresses is displayed on operation screen 320A of the operation panel.

As described above, a plurality of registered addresses "AA," "BB," . . . "HH" are displayed in the registered address list region 400. Cursor bar 404A is provided. An up button or down button of cursor bar 404A is pressed to scroll the registered addresses displayed in list region 400.

Referring to FIG. 8(B), here, an operation screen 320C in a case where the flick operation is accepted will be explained.

As shown in the figure, the registered address list region 400B is enlarged leftward and rightward and displayed in response to acceptance of the flick operation. Here, the registered addresses "AA," "BB," . . . "JJ" are displayed.

This process allows the user to easily grasp the contents displayed in list region 400B because of the enlargement of the registered address list region 400B. In addition, the enlargement of the region for accepting input such as the flick operation can improve operability.

In this example, in a case where the flick operation process is executed only in the left direction, the list region may be enlarged in the left direction and displayed. That is, the region for accepting input such as the flick operation may be changed by changing the display region in accordance with the direction of the flick operation.

(Second Modification)

In a second modification, when there exists a region that should not be hidden, enlargement of the display region is restricted, and a range in which input such as the flick operation is accepted is restricted.

Figures 9, 10:
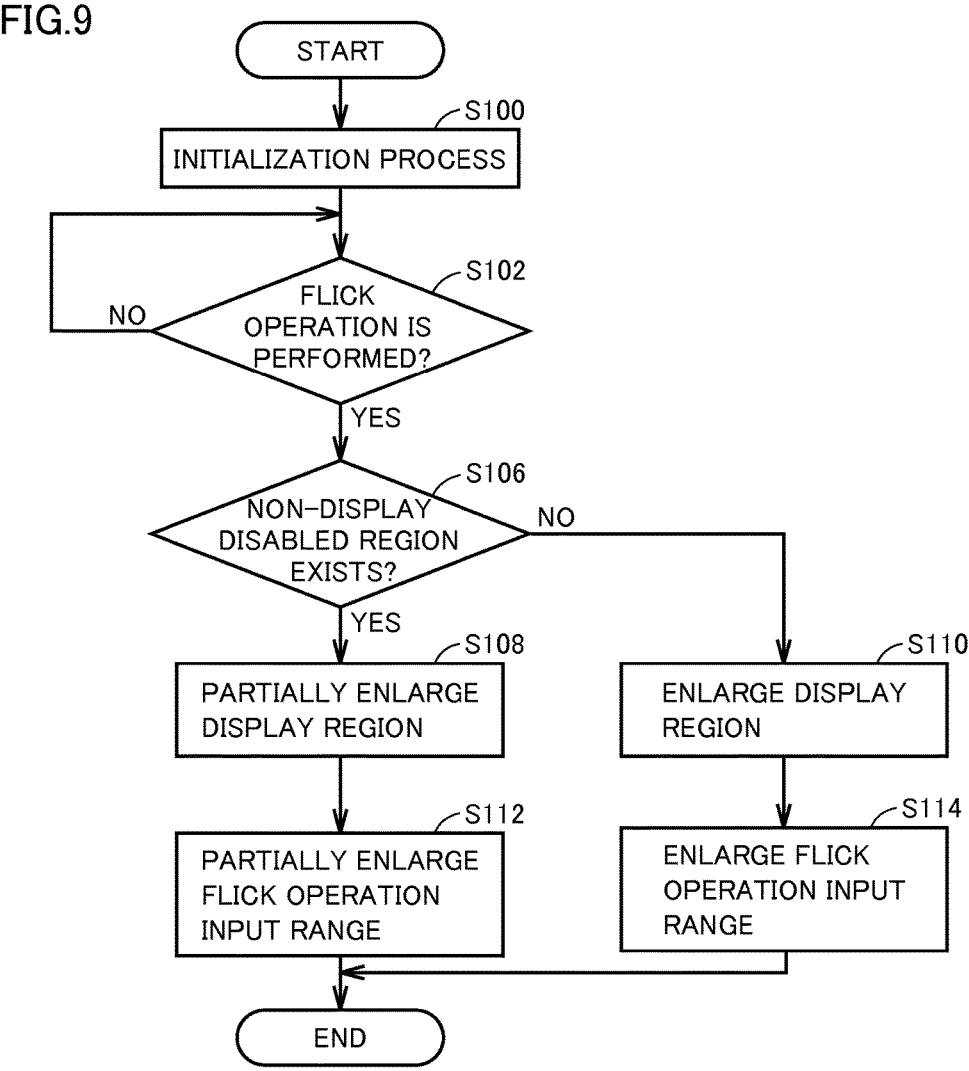
FIG. 9 is a flowchart illustrating an overview of a process of CPU 101 in accordance with flick operation on the operation panel of image processing apparatus 1-x according to a second modification of the embodiment of the present invention.
FIG. 10 is a diagram illustrating the correspondence between an input accepting region and a non-display disabled region according to the second modification of the present invention.

FIG. 9 is a flowchart illustrating an overview of a process of CPU 101 in accordance with the flick operation on the operation panel of image processing apparatus 1-x according to the second modification of the embodiment of the present invention.

Referring to FIG. 9, CPU 101 starts the process upon power-on. First, an initialization process including clearing the memory, setting the standard mode, and the like is performed (step S100).

Upon completion of the initialization process in step S100, it is determined whether the user performs the flick operation, based on an operation on touch panel 311 on the display of operation panel 130 of image processing apparatus 1-x (step S102).

In step S102, if it is determined that the flick operation is performed (YES in step S102), it is determined whether there exists a non-display disabled region (step S106). The non-display disabled region will be described later.

In step S106, if it is determined that there exists a non-display disabled region (YES in step S106), the display region is partially enlarged (step S108). Then, the range of input such as the flick operation is partially enlarged, accordingly (step S112). The process then ends (END).

On the other hand, in step S106, if it is determined that a non-display disable region does not exist (NO in step S106), the display region is enlarged to maximum (step S110).

Then, the range of input such as the flick operation is enlarged, accordingly (step S114). The process then ends (END).

FIG. 10 is a diagram illustrating the correspondence between an input accepting region and a non-display disabled region according to the second modification of the present invention.

Referring to FIG. 10, here, three items "scan/fax address list," "job list," and "box document list" are each associated with the contents displayed in the region for accepting input such as the flick operation and with a region that is displayed in relation to the region for accepting input and should not be hidden (non-display disabled region), by way of example.

Specifically, in the "scan/fax address list," address information is displayed in the region for accepting input. Here, the "alphabetic sort key, the number of addresses" is associated therewith as a non-display disabled region. In other words, when "scan/fax address list" is displayed, "alphabetic sort key, the number of addresses" is allocated as a region that cannot be hidden.

Similarly, in the "job list," a list of accepted jobs is displayed in the region for accepting input. Here, the "in-progress key, history key, communication list key" is associated therewith as a non-display disabled region. In other words, when the "job list" is displayed, the "in-progress key, history key, communication list key" is allocated as a region that cannot be hidden.

Similarly, in the "box document list," the saved documents are displayed in the region for accepting input. Here, the "select all key, clear all key" is associated therewith as a non-display disabled region. In other words, when the "box document list" is displayed, the "select all key, clear all key" is allocated as a region that cannot be hidden.

Figure 11:
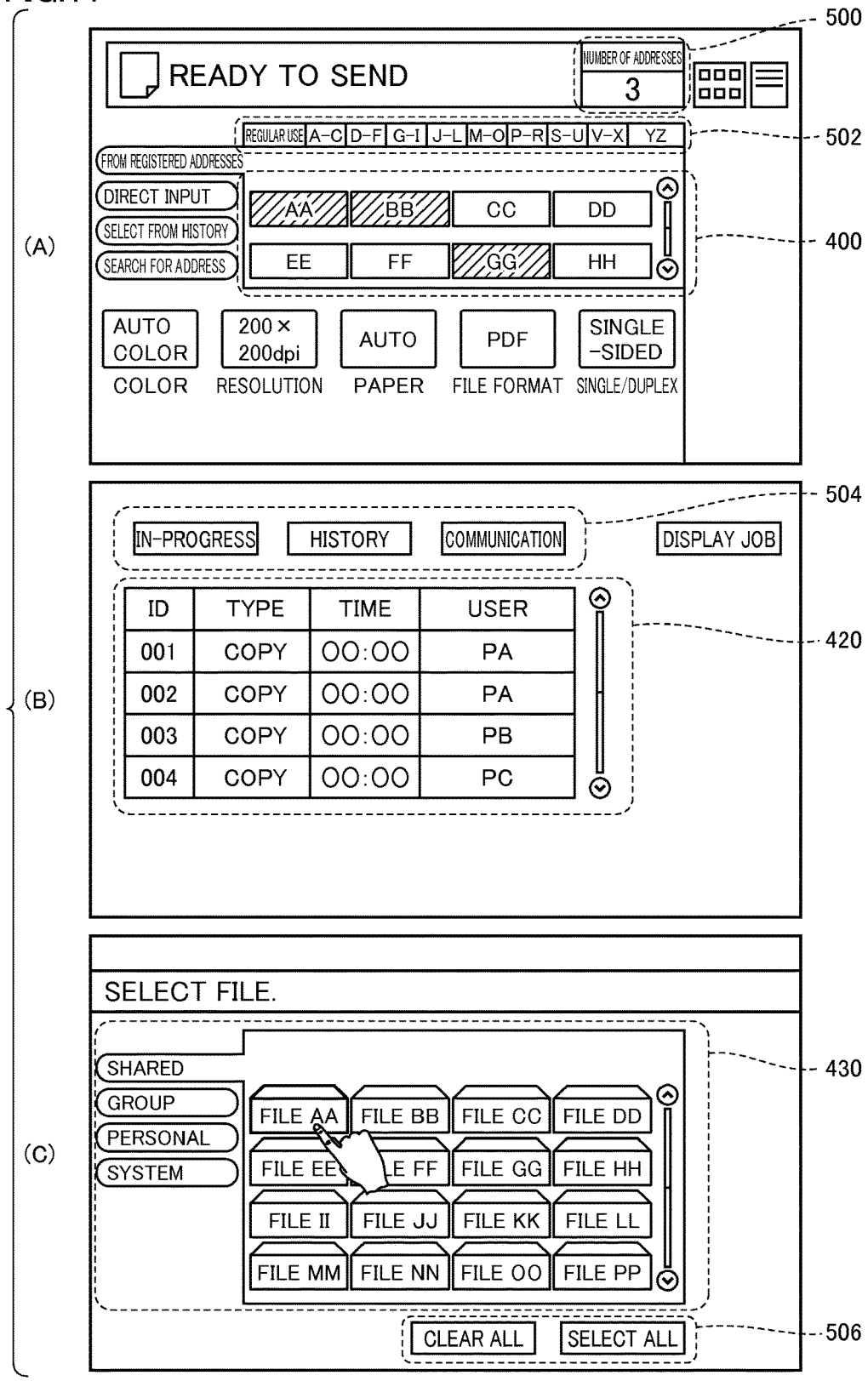
FIG. 11 is a diagram illustrating an example of a screen of the operation panel according to the second modification of the embodiment of the present invention.

FIG. 11 is a diagram illustrating an example of a screen of the operation panel according to the second modification of the embodiment of the present invention.

Referring to FIG. 11(A), here, address information is displayed in the "scan/fax address list." Then, a region 502 with icons "alphabetic sort keys" and a region 500 labeled "the number of addresses" are provided. In this case, region 500 and region 502 are designated as non-display disabled regions.

Therefore, even when the flick operation is accepted in the registered address list region 400, enlargement of the display region, that is, enlargement of the range in which input is accepted has to be restricted because of the presence of the non-display disabled regions.

Referring to FIG. 11(B), here, a job history is displayed in the "job list." Then, a region 504 labeled "in-progress key, history key, communication list key" is provided. In this case, region 504 is designated as a non-display disabled region.

Therefore, even when the flick operation is accepted in a job history list region 420, enlargement of the display region, that is, enlargement of the range in which input is accepted has to be restricted because of the presence of the non-display disabled region.

Referring to FIG. 11(C), here, saved documents are shown in the "box document list." A region 506 labeled "select all key, clear all key" is provided. In this case, region 506 is designated as a non-display disabled region.

Therefore, even when the flick operation is accepted in a saved document list region 430, the enlargement of the display region, that is, the enlargement of the range in which input is accepted has to be restricted because of the presence of the non-display disabled region.

Figure 12:
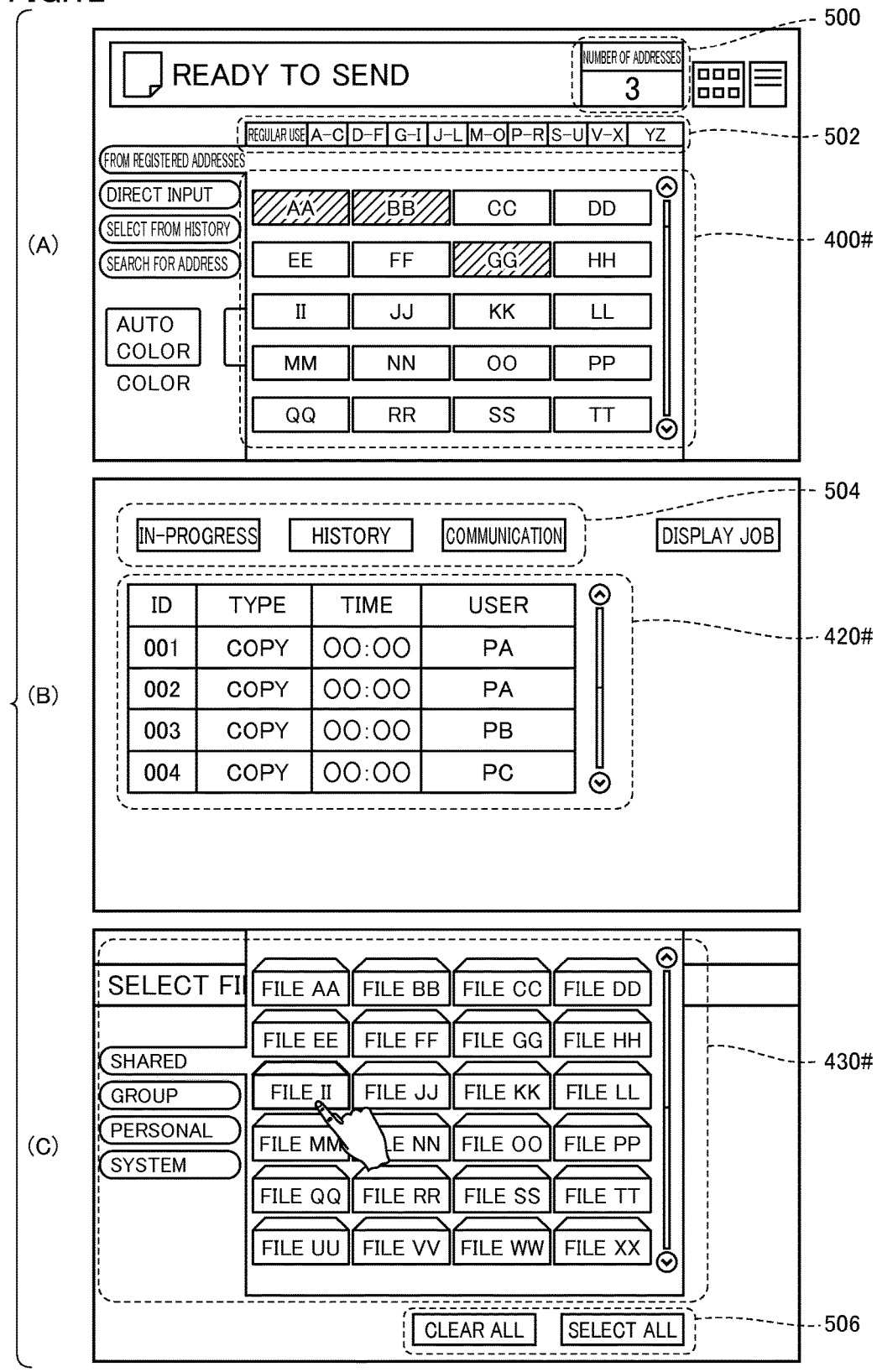
FIG. 12 is a diagram illustrating an example of a changed screen of the operation panel according to the second modification of the embodiment of the present invention.

FIG. 12 is a diagram illustrating an example of a changed screen of the operation panel according to the second modification of the embodiment of the present invention.

Referring to FIG. 12(A), a list region 400# is shown in which the registered addresses are expanded only on the lower side so as not to affect the non-display disabled regions because region 502 with the icons "alphabetic sort keys" and region 500 labeled "the number of addresses" are designated as non-display disabled regions as described above.

Referring to FIG. 12(B), a job history list region 420# is shown in which it is expanded only on the lower side so as not to affect the non-display disabled region because region 504 labeled "in-progress key, history key, communication list key" is designated as a non-display disabled region as described above.

Referring to FIG. 12(C), a saved document list region 430# is shown in which it is expanded only on the upper side so as not to affect the non-display disabled region because region 506 labeled "select all key, clear all key" is designated as a non-display disabled region as described above.

According to this manner, if the region displayed in connection with the region for accepting input includes a region that should not be hidden (display region, icon), this region is given priority, and the range in which input such as the flick operation is accepted is restricted in its range to be enlarged. Accordingly, a flick input becomes easy while the user's convenience in other operation can be kept.

In this example, the enlargement upward and downward has been described. However, for example, enlargement in the left and right directions is also possible.

(Third Modification)

In a third modification, if a region that should not be hidden exists, the display region is not enlarged.

FIG. 13 is a flowchart illustrating an overview of a process of CPU 101 in accordance with the flick operation on the operation panel of image processing apparatus 1-x according to a third modification of the embodiment of the present invention.

Referring to FIG. 13, CPU 101 starts the process upon power-on. First, an initialization process including clearing the memory, setting the standard mode, and the like is performed (step S100).

Upon completion of the initialization process in step S100, it is determined whether the user performs the flick operation, based on an operation on touch panel 311 on the display of operation panel 130 of image processing apparatus 1-x (step S102).

In step S102, if it is determined that the flick operation is performed (YES in step S102), it is determined whether there exists a non-display disabled region (step S106). The non-display disabled region will be described later.

In step S106, if it is determined there exists a non-display disabled region (YES in step S106), the display region is not enlarged (step S109). The range of input such as the flick operation is not enlarged, either (step S113). The process then ends (END).

On the other hand, in step S106, if it is determined that a non-display disabled region does not exist (NO in step S106), the display region is enlarged to maximum (step S110).

Then, the range of input such as the flick operation is enlarged, accordingly (step S114). The process then ends (END).

According to this manner, if the region displayed in connection with the region for accepting input includes a region that should not be hidden (display region, icon, and the like), the display region is prevented from being enlarged and hiding. Accordingly, the user's convenience in operation can be kept.

It is noted that the image processing apparatus in the present invention is not limited to an MFP but may be a printer, a facsimile machine, or the like.

A program causing a computer to function to execute the control described in the foregoing flows may be provided. Such a program may be recorded in a computer readable recording medium such as a flexible disk, a CD-ROM (Compact Disk-Read Only Memory), a ROM (Read Only Memory), a RAM (Random Access Memory), and a memory card, which accompanies a computer, and be provided as a program product. Alternatively, the program may be recorded in a recording medium such as a hard disk contained in a computer.

The program in accordance with the present invention may allow the process to be executed by invoking necessary modules, among program modules provided as a part of an Operating System (OS) of a computer, in a prescribed sequence at a prescribed timing. In this case, the aforementioned modules are not included in the program itself and the process is executed in cooperation with the OS. The program that does not include such modules may also be included in the program in accordance with the present invention.

Furthermore, the program in accordance with the present invention may be built in a part of another program. In this case, the modules included in another program are not included in the program itself, and the process is executed in cooperation with another program. Such a program built in another program may also be included in the program in accordance with the present invention.

The program product provided is installed in a program storage portion such as a hard disk for execution. It is noted that the program product includes the program itself and a recording medium encoded with the program.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A Multi-Functional Peripheral (MFP) comprising:
a display including a touch panel via which a user can input an operation by touching the panel;
a detection unit configured to detect input of operation to the display; and
a processor, wherein
the display is configured to display a display region that determines a range in which flick operations are accepted, where flick operations comprise movements of the location of a touch on the panel at a speed equal to or higher than a threshold value,
when the input of operation detected by the detection unit is a flick operation given for an area of said display region, the processor first determines whether a non-display disabled region exists in response to the flick operation, and in response to determining that a non-display disabled region exists, (i) enlarges the display region based on the flick operation such that the enlarged display region overlaps and hides previously displayed first information located outside of said display region and outside of said non-display disabled region, and (ii) limits the enlargement of the display region so that second information, included in the non-display disabled region, remains unhidden and visible on the display, and
the enlarged display region includes a scrollable list of objects, is displayed so as to accept subsequent flick operations, and when scrolled, displays additional objects.

2. The MFP according to claim 1, wherein said processor is configured to determine the input of the flick operation is given, based on coordinates at which the input of a touch operation detected by the detection unit is accepted and coordinates at which a movement of the touch operation is terminated.

3. The MFP according to claim 1, wherein
the input of said flick operation given for said area of said display region includes an input direction of said flick operation, and
said processor determines an input direction of said flick operation, enlarges said display region in accordance with the input direction of said flick operation, and displays the enlarged display region on said display.

4. The MFP according to claim 1, wherein
a cursor bar is displayed on said display region for scrolling the display content displayed in said display region in accordance with enlargement of said display region based on the input of said flick operation, said cursor bar having a length corresponding to said display region, and
said processor is configured to enlarge the length of said cursor bar along with the enlargement of said display region and displays the enlarged cursor bar in said enlarged display region.

5. The MFP according to claim 1, wherein a list of a plurality of pieces of information is displayed in said display region.

6. The MFP according to claim 1, wherein
the image processing apparatus further comprises a scanner to scan an original image, and
a plurality of registered address information is displayed in the display region, the plurality of registered address information being used in transmission of an image data reproduced in scanning of the original image.

7. The MFP according to claim 6, wherein the second information indicates the number of addresses to which the image data is to be transmitted.

8. The MFP according to claim 6, wherein the second information indicates an alphabetic sort key of an address to which the image data is transmitted.

9. The MFP according to claim 1, wherein a job list to be performed by the image processing apparatus is displayed in the display region.

10. The MFP according to claim 9, wherein the second information includes a plurality of keys associated with the job list.

11. The MFP according to claim 1, wherein a list of saved documents in the image processing apparatus is displayed in the display region.

12. The MFP according to claim 11, wherein the second information indicates a select all key.

13. A method of controlling a multi-functional peripheral (MFP) including (i) a display including a touch panel via which a user can input an operation by touching the panel and configured to display a display region to accept a flick operation, where a flick operation comprises movement of the location of a touch on the panel at a speed equal to or higher than a threshold value, (ii) a detection unit configured to detect input of operation to the display, and (iii) a processor, said method comprising:
when the input of operation detected by the detection unit is a flick operation given for an area of the display region, first determining, by the processor, whether a non-display disabled region exists in response to the flick operation and, in response to determining that a non-display disabled region exists, (i) enlarging the display region based on the flick operation such that the enlarged display region overlaps and hides previously displayed first information located outside of said display region and outside of said non-display disabled region and (ii) limiting, by the processor, enlargement of the display region so that second information, included in the non-display disabled region, remains unhidden and visible on the display, wherein
the enlarged display region includes a scrollable list of objects, is displayed so as to accept subsequent flick operations, and when scrolled, displays additional objects.

14. The method according to claim 13, further comprises determining, by the processor, the input of said flick operation is given, based on (i) coordinates at which the input of a touch operation detected by the detection unit is accepted and (ii) coordinates at which a movement of the touch operation is terminated.

15. The method according to claim 13, wherein
the input of said flick operation given for said area of said display region includes the input direction of said flick operation, and
the method further includes:
determining, by said processor, an input direction of said flick operation,
enlarging, by said processor, said display region in accordance with the input direction of said flick operation, and
displaying, by said processor, the enlarged display region on said display.

16. The method according to claim 13, further comprising:
displaying, on said display region, a cursor bar for scrolling the display content displayed in said display region in accordance with enlargement of said display region based on the input of said flick operation, said cursor bar having a length corresponding to said display region, and
enlarging, by said processor, the length of said cursor bar along with the enlargement of said display region and displaying the enlarged cursor bar in said display region.

17. The method according to claim 13, wherein a list of a plurality of pieces of information is displayed in said display region.

18. A non-transitory recording medium encoded with a control program executed by a computer of a multi-functional peripheral (MFP) including (i) a display including a touch panel via which a user can input an operation by touching the panel and configured to display a display region to accept a flick operation, where a flick operation comprises movement of the location of a touch on the panel at a speed equal to or higher than a threshold value, (ii) a detection unit configured to detect input of operation to the display, and (iii) a processor, said control program allowing said computer to execute processing comprising:
when the input of operation detected by the detection unit is a flick operation given for an area of the display region, first determining whether a non-display disabled region exists in response to the flick operation and, in response to determining that a non-display disabled region exists, (i) enlarging the display region based on the flick operation such that the enlarged display region overlaps and hides previously displayed first information located outside of said display region and outside of said non-display disabled region and (ii) limiting enlargement of the display region so that second information, included in the non-display disabled region, remains unhidden and visible on the display, wherein the enlarged display region includes a scrollable list of objects, is displayed so as to accept subsequent flick operations, and when scrolled, displays additional objects.

19. The recording medium according to claim 18, wherein said control program further allows said computer to execute determining the input of said flick operation is given, based on (i) coordinates at which the input of a touch operation is accepted and (ii) coordinates at which a movement of the touch operation is terminated.

20. The recording medium according to claim 18, wherein the input of said flick operation given for said area of said display region includes the input direction of said flick operation, and wherein said control program further allows said computer to execute determining an input direction of said flick operation, enlarging said display region in accordance with the input direction of said flick operation, and displaying the enlarged display region on said display.

21. The recording medium according to claim 18, wherein a cursor bar for scrolling the display content displayed in said display region is displayed on said display region in accordance with enlargement of said display region based on the input of said flick operation, said cursor bar having a length corresponding to said area of said display region, and wherein the enlarging includes enlarging the length of said cursor bar along with the enlargement of said display region and displaying includes displaying the enlarged cursor bar in said enlarged display region.

22. The recording medium according to claim 18, wherein a list of a plurality of pieces of information is displayed in said display region.

* * * * *